July 15, 1952  D. J. MOSSHART  2,603,421
HYDRAULIC CONTROL APPARATUS FOR SPREADER STOKERS
Filed Feb. 2, 1949  5 Sheets-Sheet 1

INVENTOR
Donald J. Mosshart
BY
ATTORNEY

July 15, 1952   D. J. MOSSHART   2,603,421
HYDRAULIC CONTROL APPARATUS FOR SPREADER STOKERS
Filed Feb. 2, 1949   5 Sheets-Sheet 2

WITNESSES:
U. W. Novak
E. H. Lutz

INVENTOR
Donald J. Mosshart
BY
ATTORNEY

INVENTOR
Donald J. Mosshart

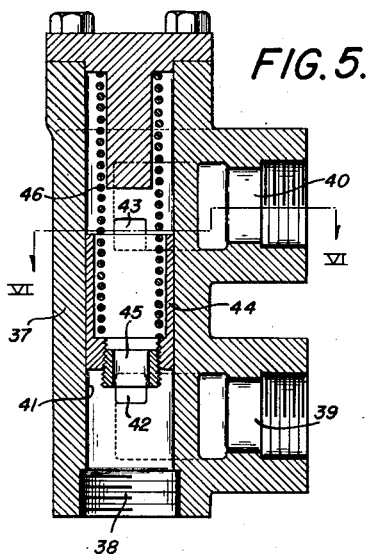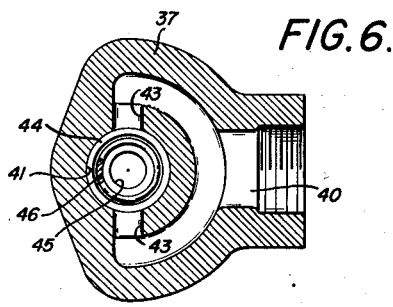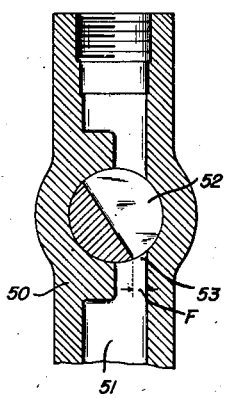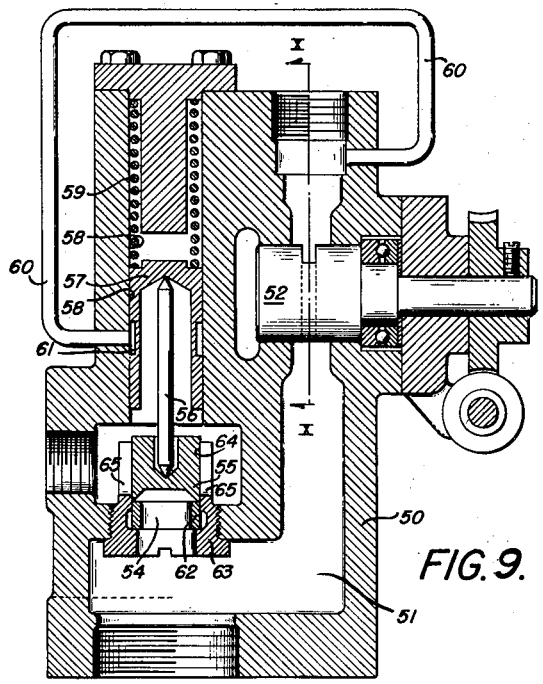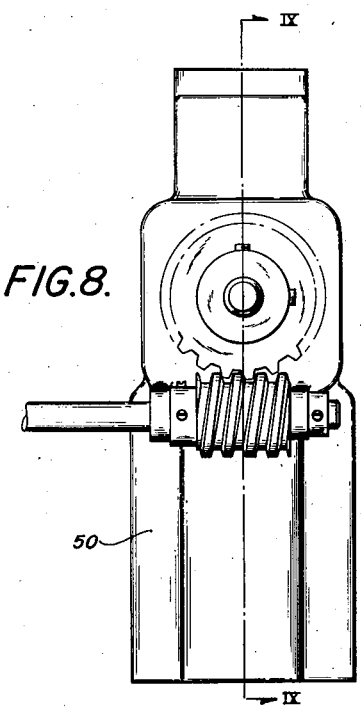

Patented July 15, 1952

2,603,421

UNITED STATES PATENT OFFICE 2,603,421

HYDRAULIC CONTROL APPARATUS FOR SPREADER STOKERS

Donald J. Mosshart, Ardmore, Pa., assignor to Westinghouse Electric Corporation, East Pittsburgh, Pa., a corporation of Pennsylvania Application February 2, 1949, Serial No. 74,174

18 Claims. (Cl. 236—14)

The invention relates to stokers, more particularly of the spreader type, having a plurality of movable components and it has for an object to provide a unitary hydraulic arrangement for driving the components to meet the requirements of operation of the stoker.

A spreader stoker comprises a fuel-feeding device, a distributor rotor, and a movable fuel-supporting grate, each driven by suitable power means. In accordance with the present invention, these components are driven by hydraulic motors furnished with oil from three supplies having fixed relative flow rates obtained by dividing the discharge from a constant volume or flow rate pump into two parts and then subdividing one of such parts into two parts, whereby the other part of the first division and the two parts of the subdivision constitute the three supplies for driving the rotor, the fuel-feeding device, and the grate motors.

Another object of the invention is to provide, for the oil supply driving the fuel-feeding device motor, by-pass means subject either to manual or to automatic control so that fuel may be fed at the required rate.

A further object of the invention is to by-pass oil from the fuel-feeding device motor supply so that oil may be delivered to such motor at a flow rate dependent upon boiler draft or upon manual adjustment and at whatever pressure is required for operation of the motor at the speed corresponding to the flow rate.

Still another object of the invention is to provide a hydraulic drive including a constant volume or flow rate pump a first proportional valve for dividing liquid discharged by the pump into a pair of parts having a fixed ratio of flow rates, a second proportioning valve for subdividing one of said parts into a pair of parts having a fixed ratio of flow rates and motors operated by oil delivered by the other of said first division parts and the subdivided parts.

A further object of the invention is to provide a spreader stoker drive of the above character with means for transforming the pressure difference between a pair of spaced points along the boiler gas passage into amplified oil pressure which is used to control the fuel input.

Another object of the invention is to provide, for apparatus of the above character, an orifice through which oil flows to the fuel-feeding motor and a by-pass valve at the upstream side of the orifice with means for positioning the by-pass valve in response to differential pressure across the orifice and said amplified oil pressure proportional to draft.

A further object of the invention is to provide, for a hydraulic drive, a proportioning valve having oil delivered thereto and which divides the oil into a pair of parts with the flow rate of one of said parts fixed and the other of said parts having a flow rate equal to the delivery rate minus the flow rate of said first part.

The foregoing and other objects are effected by the invention as will be apparent from the following description and claims taken in connection with the accompanying drawings, forming a part of this application, in which:

Figs. 5 and 6 are sectional detail views of the proportioning valve, Fig. 6 being a sectional view taken along the line VI—VI of Fig. 5;

Fig. 8 is an elevational view of one of the manual control valves;

Fig. 9 is a sectional view taken along the line IX—IX of Fig. 8;

Fig. 10 is a sectional view taken along the line X—X of Fig. 9; and

A spreader stoker usually incorporates a distributor rotor supplied with fuel by a feeding device or ram and grates for supporting the fuel bed. In accordance with the present invention, there is provided a hydraulic system delivering oil to motors for driving the rotor, the fuel-feeding device or ram, and the grates, with provision for the fuel-feeding device being controlled either automatically, in response to the flow rate of combustion air, or manually. The hydraulic system includes a constant speed pump delivering oil at a constant volume or rate of flow, a first proportioning valve dividing the pump delivery into a first supply and a remainder having a fixed ratio of flow rates, a second proportioning valve for subdividing said remainder into second and third supplies having a fixed ratio of flow rates, conduits for delivering the first, second and third supplies of oil to the motors for driving the distributor motor, the fuel-feeding device and the grates. To secure delivery of fuel for combustion automatically at a rate which is in fixed selected ratio to the flow rate of combustion air, the conduit for supplying said second supply of oil to the fuel-feeding device motor has an orifice and a by-pass valve arranged upstream of the orifice and responsive to boiler draft so that the motor is driven at a speed to deliver fuel in proportion to the air flow rate. By adjustment of the orifice area, the fuel delivery rate may be varied relative to the air flow rate to obtain the required fuel-air ratio. The manual control device has a valve member adjustable manually to provide a variable orifice together with a by-pass valve arranged upstream of the orifice and loaded by a spring to provide a predetermined differential pressure across the orifice, whereby the orifice area is a measure of the flow rate to the motor and consequently the fuel-feed is proportional to position of the movable valve member. To provide for change-over from automatic to manual control, the second supply conduit has a pair of branches for supplying the fuel-feeding device motor and a transfer valve operating to cause the second supply oil to flow through either branch to the motor. One branch has the automatic control and the other branch has the manually controlled one. Provision is preferably made for varying the rotor speed, and this may be done by using a manual control valve of the above type for the oil supply to the rotor motor.

Figure 1:
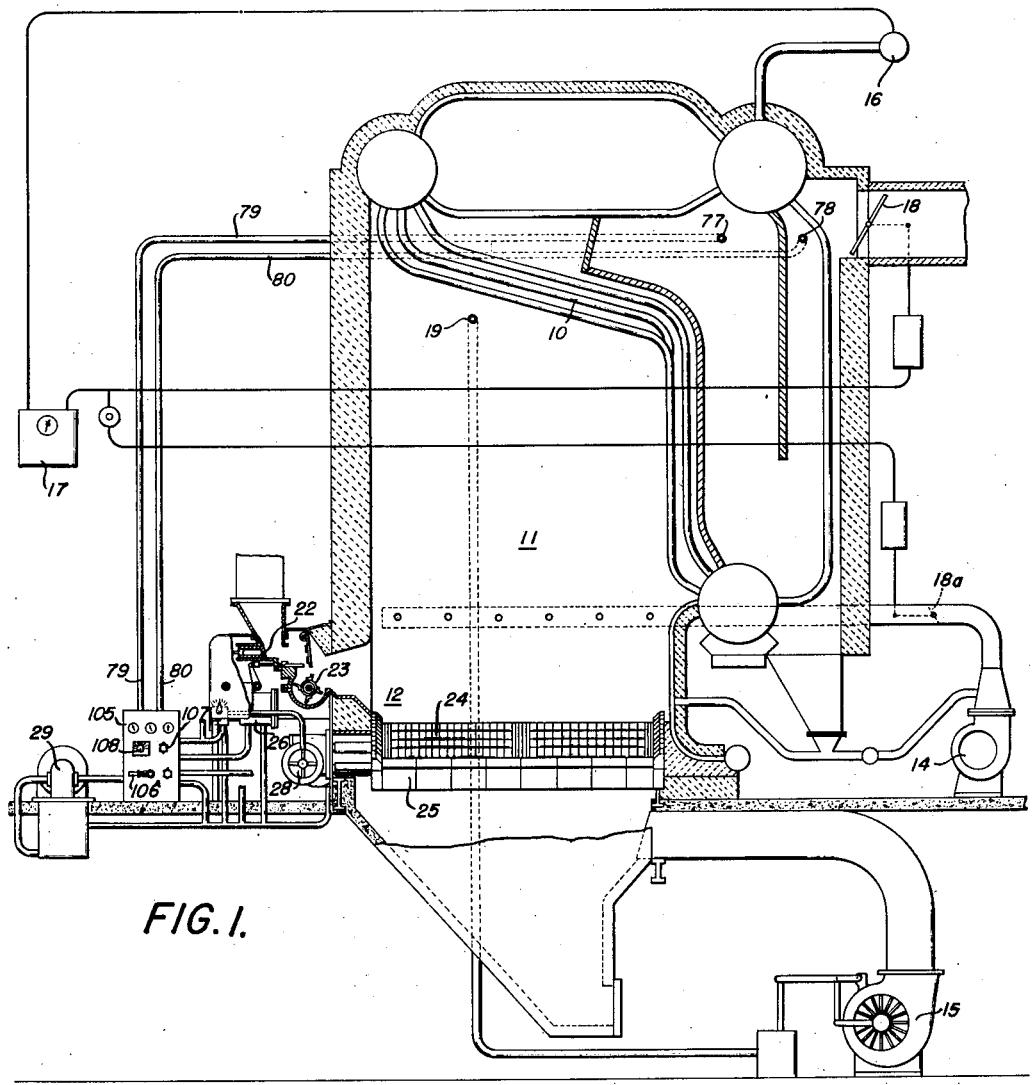
Fig. 1 is a diagrammatic view showing a stoker and boiler installation with the improved hydraulic control system.
Figure 2:
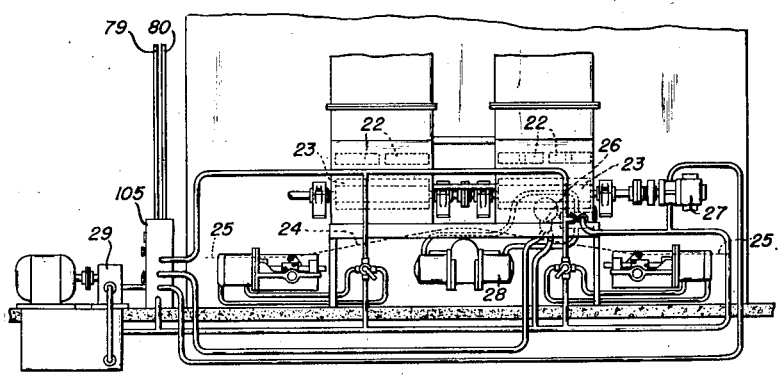
Fig. 2 is a front elevational diagrammatic view of the installation showing an arrangement of the improved hydraulic control system.

Referring to the drawings more in detail, in Fig. 1 there is shown a boiler 10, a furnace chamber 11, a stoker, at 12, and combustion air blowers 14 and 15.

The installation is preferably equipped with any suitable control system responsive to steam demand. As shown, the steam header 16 supplies steam pressure to the master regulator 17 which controls operation of the stack damper 18 and and the secondary air damper 18a. A furnace chamber pressure pick-up 19 controls the blower 15 to maintain a substantially constant negative pressure condition in the furnace chamber.

The stoker, at 12, is of the spreader type, including a fuel-feeding device 22, a rotor 23, fuel-supporting grates 24 of any suitable type, and dump grataes 25 operated by a unitary hydraulic system including motors 26, 27 and 28, for driving the fuel-feeding device, the rotor, and the fuel-supporting grates, respectively. The rotor motor 27 is preferably of the gear type and the motors 26 and 28 are of the reciprocating type.

The hydraulic system comprises a constant volume or flow rate pump 29, a first proportioning valve 31 for dividing the oil delivered thereto by the pump into a pair of parts having a fixed ratio of flow rates, one of the parts being furnished to the first supply conduit 32 and the other or remainder part being conducted by the passage 33 to a second proportioning valve 34 for subdividing such remainder part into a pair of parts having a fixed ratio of flow rates and furnished to the second supply conduit 35 and to the third supply conduit 36.

As shown in Figs. 5 and 6, each proportioning valve includes a body 37 having an inlet 38 and a pair of outlets 39 and 40. The body has a cylinder 41 communicating with the inlet 38 and with the outlets 39 and 40 through ports 42 and 43, respectively. A hollow piston 44 in the cylinder has an orifice 45 through which oil flows from the inlet 38 and the space below the piston to the space thereabove. A spring 46 exerts force on the piston in opposition to that exerted thereon by oil supplied through the inlet 38. The pressure difference causing flow through the orifice is equal to the ratio of spring force to the effective piston area of the piston 44.

In operation, and assuming a mean position of the piston partially covering the ports 42 and 43, if pressure at the outlet 40 decreases relative to that at the outlet 39, the piston 44 moves upwardly, decreasing the area of the port 43 and reducing the orifice flow to avoid substantial change in the flow rate through the outlet 40. If the pressure at the outlet 40 should increase relative to that at the outlet 39, the piston 44 moves downwardly to cover the port 42 to increase the pressure below the piston 44 and thereby to maintain the flow rate through the outlet 40. With the inlet 38 supplied at a constant flow rate, since the flow rate of the outlet 40 is maintained substantially constant, as just pointed out, the flow rate of the outlet 39 will also be substantially constant.

The first supply passage 32 from the proportioning valve 31 furnishes oil to the rotor motor 27, preferably through a control valve, at 45; the second supply conduit 35 from the second proportioning valve has an initial portion connected, by a transfer valve 46, through either of the branch conduits 47 and 48, to the final portion thereof and it conducts oil to the fuel-feeding motor 26; and the third supply conduit 36, furnished with oil by the second proportioning valve, supplies such oil to the grate motor 28. The branch passage 47 includes automatic control apparatus, hereinafter described, and the branch conduit 48 includes a manually-controlled valve, at 45a, similar to the valve, at 45.

Since flow from the inlet 31 to the distributor rotor motor 27 must occur through the piston orifice 45, if the rotor should jam, the pressure above the piston increases and the latter moves down to restrict flow through the passage 33 to the second proportioning valve, whereby the fuel feed and the grates are stopped thus avoiding filling of the rotor enclosure with fuel.

The manual control valves, at 45, and, at 45a, (Figs. 8, 9 and 10) each include a body 50, a passage 51, a metering valve 52 defining a variable orifice 53 for the passage, a by-pass port 54 at the upstream side of the orifice, a cup valve 55 in covering relation with respect to the by-pass port, a thrust rod 56 having its ends engaging the cup valve and the piston 57 arranged in the cylinder 58, with a spring 59 exerting force on the piston in opposition to that exerted on the cup valve by pressure of liquid in the passage 51 at the upstream side of the orifice. A passage 60 is connected to the passage 51 at the downstream side of the orifice and it supplies oil for action on the piston to exert force on the cup valve in a closing direction. As shown, the passage 60 is connected to the cylinder 58 so as to supply oil to the channel 61 of the piston 57 and located a suitable distance from the top thereof. The flow resistance thereby introduced between the space above the piston and the downstream side of the orifice opposes back flow to the latter and it stabilizes operation.

Preferably, the by-pass port 54 is provided in a ring 62 mounted in a detachable ferrule 63 having a cylinder 64 for the cup valve. The cylinder has slots 65 which are covered by the cup valve when the latter is closed.

Assuming the area of the cup valve 55 exposed to oil under pressure in the passage 51 at the upstream side of the orifice 53 to be equal to the area of piston 57, the pressure difference across the orifice 53 is equal to the ratio of the spring force to the cup valve area. Therefore, the pressure drop across the orifice depends upon the spring force. With a given pressure fixed by the spring, the flow rate through the orifice 53 and to the fuel-feed motor depends upon the flow area F of such orifice. As the flow area is increased, the flow rate to the fuel-feed motor or to the rotor motor is increased. Hence, with a given flow from the second proportioning valve, the adjustable metering valve provides a means by which a definite variable portion of such flow may be supplied to the fuel-feed motor.

A similar manual control valve operating in a similar manner is preferably provided for the motor driving the distributor rotor.

The apparatus for controlling the delivery of oil from the passage 47 to the fuel-feed motor driving the distributor rotor.

The apparatus for controlling the delivery of oil from the passage 47 to the fuel-feed motor 26 to control the latter in response to draft includes a pilot pressure regulator, at 66, a fuel-air ratio valve, at 67, and a by-pass valve, at 68. The pilot pressure regulator, at 66, furnishes oil at a pressure dependent upon draft to the by-pass valve for operation of the latter to provide a pressure differential across the orifice of the fuel-air ratio valve dependent upon draft, whereby the flow rate of oil supplied to the fuel-feed motor, and therefore, motor speed, is made dependent upon the air flow rate.

The pilot pressure regulator, at 66, includes a body 69 having a diaphragm chamber 70 containing the diaphragm 71 of suitable diameter and having its periphery attached to the body. Flexible plates or diaphragms 72 and 73 are of relatively small diameter, are attached peripherally to the body and are connected by a central hub 74 to the diaphragm 71. The flexible plates or diaphragms 72 and 73 cooperate with the diaphragm 71 to define pressure chambers 75 and 76 above and below the diaphragms 71 and sealed from the atmosphere.

With pressure pick-ups 77 and 78 (Fig. 1) located in first and second gas passes of the boiler and connected, respectively, by pipes 79 and 80 to the upper and lower diaphragm chambers 75 and 76, it will be apparent that the downward differential gas pressure force exerted on the diaphragm 71 will be proportional to the pressure drop of gases flowing through the boiler between the pressure pick-up locations and, therefore, a function of gas flow or air supply.

The central hub 74 has a rod 82 depending therefrom and the lower end of the rod abuts a cup valve 83 in covering relation with respect to the port 84 for the pilot regulating passage 85 furnished with oil from a suitable pressure source, for example, the second supply passage 35, through an orifice 86.

Since the boiler draft applies force to the cup valve tending to close the latter against the force of pilot regulating oil pressure tending to open it, it will be apparent that the pilot regulating oil pressure will be maintained proportional to the draft, that is, to the pressure drop between the pick-up points 77 and 78 of the boiler gas passage. Further, the pilot regulator oil pressure is substantially greater than the differential gas pressure, the amplification being in the ratio of the diaphragm area to the cup valve area.

The fuel-air ratio valve, at 67, is arranged in the branch passage 47 and it includes an adjustable valve member 87 defining an orifice 88. As the entire flow through the orifice goes to the fuel-feed motor 26, such flow determines the speed of the latter and, therefore, the rate of fuel feed.

The by-pass valve, at 68, includes a body 90 having a passage or chamber 91 in the branch passage 47 at the upstream side of the orifice 88 of the fuel-air ratio valve. The passage or chamber 91 has a discharge or by-pass port 92 covered by a cup valve 93.

The body 90 has a chamber 94, above the chamber 91 and having a portion of enlarged diameter for the diaphragm 95 closing the upper end of the chamber. As the pilot regulator passage 85 is connected to the chamber 94, as the by-pass port 92 is directed downwardly so that closing movement of the cup valve 93 is upward, and as the cup valve 93 is connected to the diaphragm by means of a tension member 96, it will be apparent that pilot regulator pressure, dependent upon draft, acts on the diaphragm to apply closing force to the cup valve 93.

The body 90 has a by-pass discharge chamber 97 and a cylinder 98 therebelow, the chamber 97 being connected to a discharge passage or conduit and the cylinder having its lower end closed. A piston 99 in the cylinder separates the chamber or space 101 from the by-pass chamber 97. The upper end of the piston is operatively connected to the cup valve to constitute a cup valve and piston assembly. A passage 102 connects the lower chamber or space 101 with the branch passage 47 at the downstream side of the fuel-air ratio valve orifice 88.

As the cup valve is subject to the upstream pressure of the orifice 88 tending to open it and to the pressure at the downstream side of such orifice tending to close it, and, as pilot regulator oil pressure exerts force on the cup valve in a closing direction, it will be apparent that the differential pressure across the fuel-air ratio valve orifice depends upon the draft, that is, an increase in draft is accompanied by decreased by-passing and consequently by an increase in the differential pressure across the orifice.

With the areas of the cup valve 93 and the piston 99 equal, the draft determines the differential pressure across the orifice 88 and is, therefore, a measure of flow to the fuel-feed motor. With a given draft, or differential across the orifice, the flow rate to the fuel-feed motor and, therefore, the speed of the latter, depends upon the orifice area, which may be varied by manual adjustment of the valve 87.

Thus, when the forces acting upon the cup valve 93 are in equilibrium, the rate of flow of oil to the fuel-feed motor 26 and, therefore, speed of the latter is directly proportional to gas flow through the boiler. Change in ratio of fuel feed to the rate of gas flow is obtained by adjustment of the fuel-air ratio valve. If the fuel-air ratio valve is adjusted to reduce the orifice area further, less oil flow to the fuel-feed motor is required to produce a pressure drop adequate to result in equilibrium with a given value of pilot regulator pressure.

Figure 11:
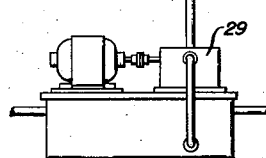
Figs. 11 and 12 are diagrammatic views showing in an exaggerated manner relations of cup valve and piston areas.
Figure 12:
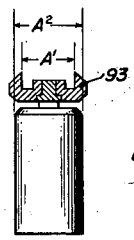

As the fuel-feed motor is subject in operation to a small amount of leakage which increases with increase in operating pressure, the cup valves 55 of the manual control valve and cup valve 93 of the automatic control device are each made slightly smaller than the associated piston areas, the area difference giving "over-compensation," that is, slight increase of oil flow to the fuel-feed motor when the operating pressure increases to compensate for greater oil leakage through the motor. This feature is illustrated in Figs. 11 and 12 showing the areas with exaggerated difference, $A_1$ being the cup valve area of the two cup valves and $A_2$ the areas of the corresponding pistons.

Figure 3:
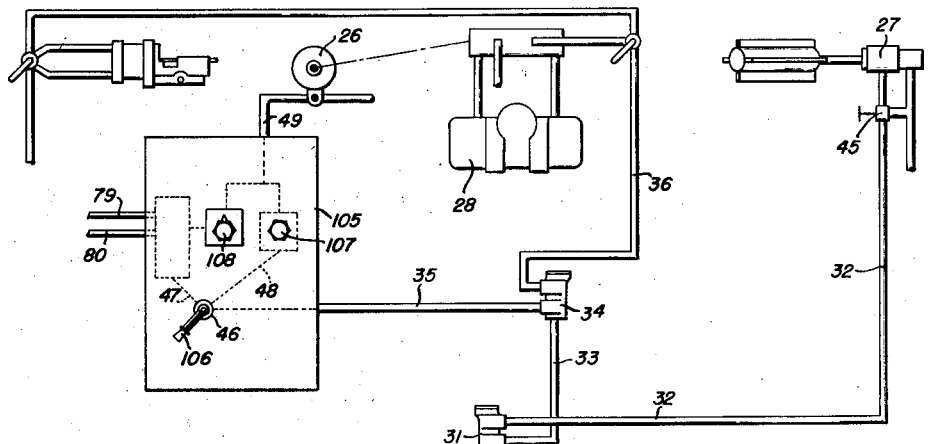
Fig. 3 is a diagrammatic view showing the hydraulic system for operating movable components of the stoker.
Figure 4:
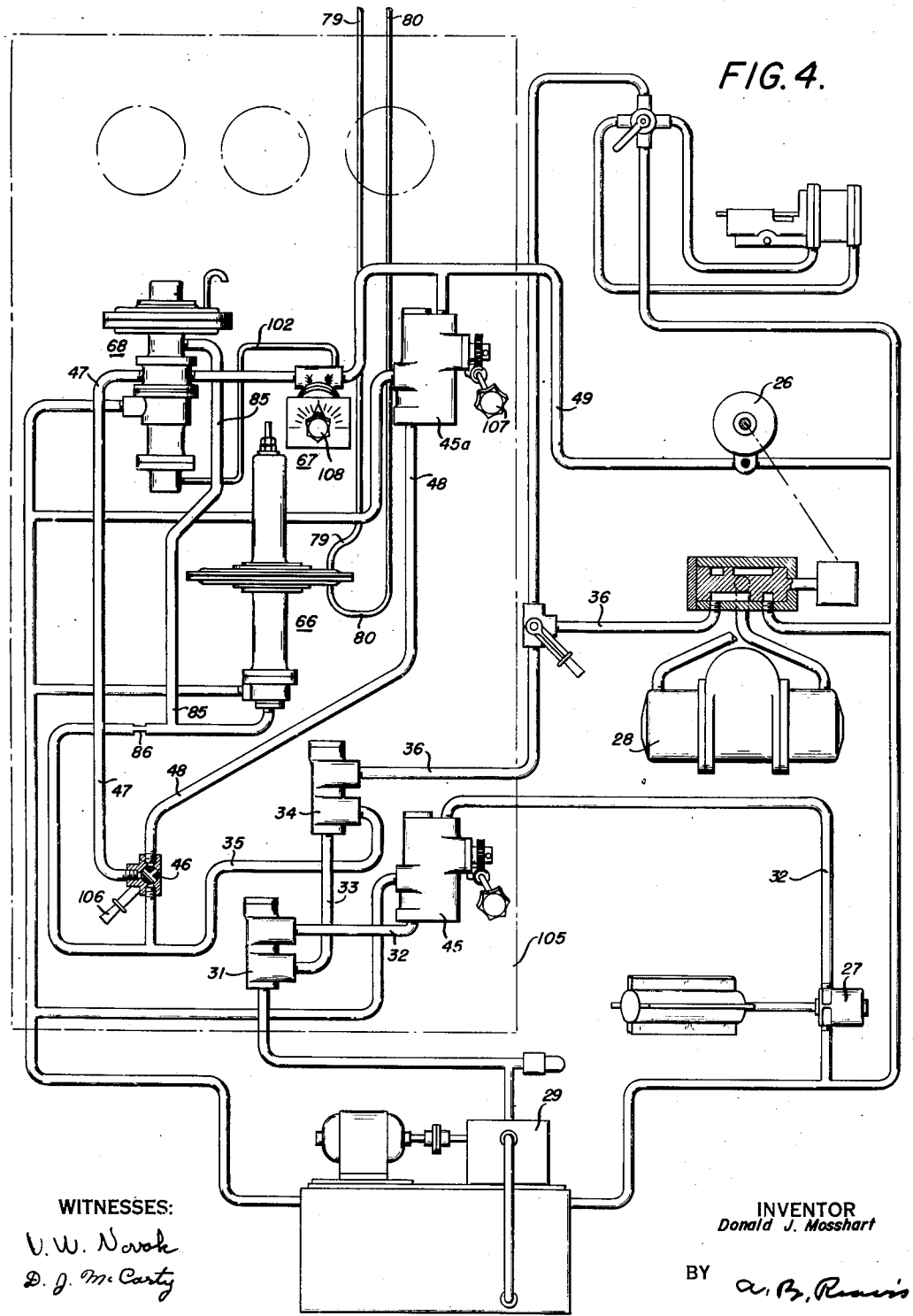
Fig. 4 is a diagrammatic view showing the hydraulic equipment required for operating the hydraulic motors or engines, including automatic or manual control of the fuel-feeding motor or engine.
Figure 7:
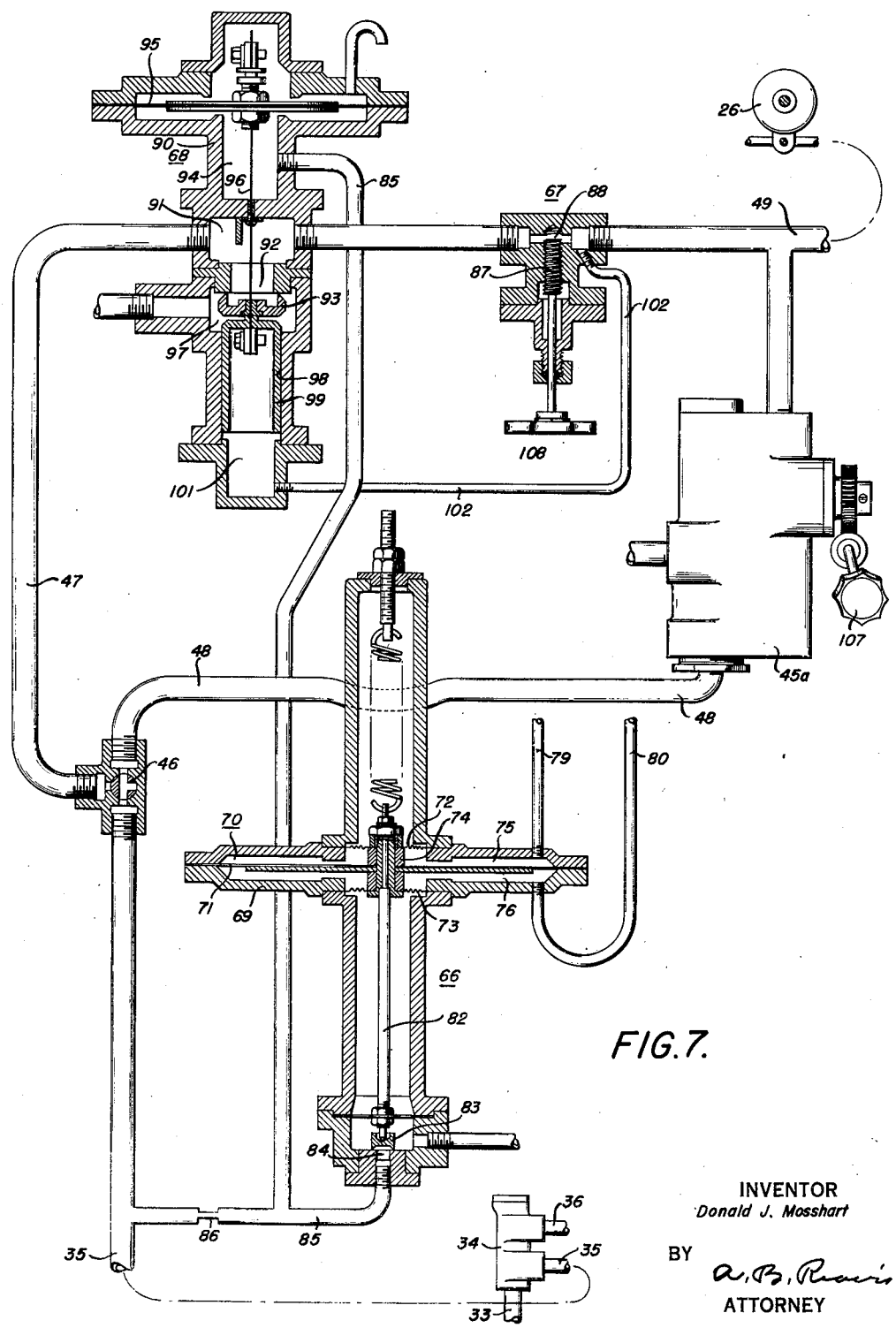
Fig. 7 is a view showing essential components of the automatic control system in section with the associated connecting piping.

As shown in Figs. 3 and 4, the automatic and manual controlling devices for supplying oil to the fuel-feed motor 26 are provided with a panel 105 to facilitate operation thereof. As shown in Fig. 3, the second supply conduit 35 provides for flow of oil to the transfer valve 46 back of the panel, the conduits 79 and 80 provide for application of boiler gas pressure to the pilot regulator back of the panel, and the conduit 49 supplied from either of the branch passages 47, 48 arranged back of the panel deliver such oil to the fuel-feed motor 26. The transfer valve, the manual control valve, and the fuel-air ratio valve are respectively provided with handwheels or handles 106, 107 and 108 carried at the front of the panel to provide convenient access for operation thereof for manual or automatic control of the fuel-feed motor.

The present invention involves a unitary hydraulic control for a spreader stoker of a boiler installation and it cooperates with a master regulator with which the latter is provided. The operation is as follows: The hydraulic system includes a constant volume pump delivering oil to a first proportioning valve which divides the oil delivered thereto into a first supply and a remainder having a fixed ratio of flows, as determined by the operating characteristics of the proportioning valve. The remainder flow is subdivided into second and third supplies by a second proportioning valve.

The first, second and third supplies, provided by the proportioning valves, are used to operate motors for driving the distributor rotor, the fuel-feeding device and the grates.

The passage supplying first supply of oil for operation of the distributor rotor has a control device manually operable to vary the rate of input of oil to the rotor and, therefore, the speed of the latter.

The second supply is furnished either through an automatic control device or a manually-operable control device, as determined by operation of a transfer valve, for operation of the fuel-feed motor.

The automatic control device operates to control the flow of oil to the fuel-feed motor in response to boiler gas flow with maintenance of a predetermined fuel-air ratio. The differential of boiler gas pressures is transformed into an amplified oil pressure, used in conjunction with up and downstream pressures of the fuel-air ratio valve, to control by-passing of oil from the second supply and, therefore, to control the oil input to the fuel-feed motor and the speed of the latter. Assuming the fuel-air ratio valve is adjusted for a given ratio, fixed by the size of the valve orifice, then, as the up and downstream orifice pressures and the boiler gas pressures control the extent of by-passing, it will be apparent that change in boiler gas flow causes a change in fuel feed with the latter held in definite ratio with respect to the change in gas or air flow.

As the hydraulic system is supplied with oil at a constant rate from a single source, as the proportioning valves divide the oil so supplied into supplies having predetermined ratios of flow, and as the supplies operate positive displacement motors for driving the fuel-feeding device, the distributor rotor and the grates, it is assured that these stoker components have correlated motions irrespective of pressure variations required to produce such motions. The fuel feed may be varied automatically or manually and the distributor rotor speed is subject to manual control. With the fuel feed subject to automatic control, change in boiler gas flow pursuant to change in boiler load produces proportional change in flow of oil to the fuel-feed motor so as to cause the latter to change the rate of fuel feed to suit the boiler gas flow with maintenance of a predetermined fuel-air ratio.

While the invention has been shown in but one form, it will be obvious to those skilled in the art that it is not so limited, but is susceptible of various changes and modifications without departing from the spirit thereof.

What I claim is:

1. In a stoker-fired boiler wherein the stoker is furnished with fuel by a distributor rotor supplied from a fuel-feeding device, the combination of, means providing first and second supplies of oil flowing at fixed rates; a hydraulic motor operated by said first oil supply and adapted to drive the rotor; means for by-passing oil from said second supply to produce a remainder flowing at a reduced rate; a hydraulic motor operated by said second supply remainder and adapted to drive the fuel-feeding device; a diaphragm adapted to respond to the differential of gas pressures at a pair of spaced points along the path of boiler gas flow; means including a discharge port providing a transformed oil pressure space; an orifice adapted to supply oil from a pressure source to said space; a cup valve covering said discharge port and connected to the diaphragm so that the differential gas pressure applied to the diaphragm applies force to the cup valve in the closing direction and which force is balanced by the transformed oil pressure force applied to the cup valve and tending to move the latter in an opening direction, whereby, as the differential gas pressure applied to the diaphragm changes, the transformed oil pressure changes to maintain the balanced force relation with amplification of pressure of oil with respect to the differential gas pressure in the ratio of the area of the diaphragm to that of the cup valve; and means responsive to transformed oil pressure to control said by-passing means.

2. In a stoker-fired boiler wherein the stoker has fuel-supporting grates and is furnished with fuel by a distributor rotor supplied from a fuel-feeding device, the combination of, means providing first, second, and third supplies of oil flowing at fixed rates; a hydraulic motor operated by said first oil supply and adapted to drive the rotor; a manual control valve operative to vary the portion of said first supply delivered to the rotor motor to vary the rotor speed; means for by-passing oil from said second supply to produce a remainder flowing at a reduced rate; a hydraulic motor operated by said second supply remainder and adapted to drive the fuel-feeding device; a diaphragm adapted to respond to the differential of gas pressures at a pair of spaced points along the path of boiler gas flow; means including a discharge port providing a transformed oil pressure space; an orifice adapted to supply oil from a pressure source to said space; a cup valve covering said discharge port and connected to the diaphragm so that the differential gas pressure applied to the diaphragm applies force to the cup valve in the closing direction and which force is balanced by the transformed oil pressure force applied to the cup valve and tending to move the latter in an opening direction, whereby, as the differential gas pressure applied to the diaphragm changes, the transformed oil pressure changes to maintain the balanced force relation with amplification of pressure of oil with respect to the differential gas pressure in the ratio of the area of the diaphragm to that of the cup valve; and means for controlling said by-passing means in response transformed oil pressure to maintain the fuel-air ratio.

3. In a stoker-fired boiler wherein the boiler draft is controlled in response to steam demand and wherein the stoker is furnished with fuel by a distributor rotor supplied from a fuel-feeding device and is provided with movable grates, the combination of, motors adapted to drive the rotor, the fuel-feeding device and the grates and including hydraulic motors adapted to drive the rotor and the fuel-feeding device; a pump for delivering oil at a constant flow rate; means for dividing the oil delivered by the pump into a plurality of supplies each having a fixed flow rate; a first conduit furnishing one of the supplies for operation of the rotor motor; a second conduit furnishing another of said supplies for operation of the fuel-feed motor; an orifice in the second conduit; a by-pass valve for the second conduit at the upstream side of the orifice; a diaphragm adapted to respond to the differential of gas pressures at a pair of spaced points along the path of boiler gas flow; means including a discharge port providing a transformed oil pressure space; an orifice adapted to supply oil from a pressure source to said space; a cup valve covering said discharge port and connected to the diaphragm so that the differential gas pressure applied to the diaphragm applies force to the cup valve in the closing direction and which force is balanced by the transformed oil pressure force applied to the cup valve and tending to move the latter in an opening direction, whereby, as the differential gas pressure applied to the diaphragm changes, the transformed oil pressure changes to maintain the balanced force relation with amplification of pressure of oil with respect to the differential gas pressure in the ratio of the area of the diaphragm to that of the cup valve; means for controlling the by-pass valve in response to transformed oil pressure to maintain the flow rate of oil delivered to the fuel-feed motor proportional to the boiler gas flow rate; and means providing for variation of the area of the orifice for varying the ratio of fuel feed in relation to boiler gas flow.

4. In a stoker-fired boiler wherein the boiler draft is controlled in response to steam demand and wherein the stoker is furnished with fuel by a distributor rotor supplied from a fuel-feeding device, the combination of, a hydraulic motor adapted to drive the rotor and the fuel-feeding device; conduits delivering oil to the motors for operation thereof; means providing, for the conduits, supplies of oil flowing at fixed rates; a diaphragm adapted to respond to the differential of gas pressures at a pair of spaced points along the path of boiler gas flow; means including a discharge port providing a transformed oil pressure space; an orifice adapted to supply oil from a pressure source to said space; a cup valve covering said discharge port and connected to the diaphragm so that the differential gas pressure applied to the diaphragm applies force to the cup valve in the closing direction and which force is balanced by the transformed oil pressure force applied to the cup valve and tending to move the latter in an opening direction, whereby, as the differential gas pressure applied to the diaphragm changes, the transformed oil pressure changes to maintain the balanced force relation with amplification of pressure of oil with respect to the differential gas pressure in the ratio of the area of the diaphragm to that of the cup valve; an orifice in the conduit for supplying the fuel feeding device motor; a by-pass port for the last-named conduit and arranged at the upstream side of the orifice; a by-pass valve cooperating with the discharge end of the by-pass port and subject to orifice upstream pressure to apply force thereto in its opening direction; means provided with a pressure area subject to orifice downstream pressure for exerting force on the by-pass valve in its closing direction; and means provided with a pressure area subject to transformed oil pressure for exerting force on the by-pass valve in its closing direction.

5. Apparatus claimed in claim 4 with manually-operating means for varying the orifice area.

6. In a stoker-fired boiler wherein the stoker is furnished with fuel by a distributor rotor supplied from a fuel-feeding device and is provided with movable grates, the combination of, hydraulic motors respectively adapted to drive the rotor, the fuel-feeding device and the grates; means delivering oil at a fixed flow rate; a first proportioning valve dividing the delivered oil into a first supply and a remainder having a fixed ratio of flow rates; a second proportioning valve dividing said remainder flow into second and third supplies having a fixed ratio of flow rates; and conduits furnishing said first, second and third supplies for operation of the rotor, the fuel-feed and grate motors, respectively.

7. In a stoker-fired boiler wherein the boiler draft is controlled in response to steam demand and wherein the stoker is furnished with fuel by a distributor rotor supplied from a fuel-feeding device and is provided with movable grates, the combination of, means delivering oil at a fixed flow rate; a first proportioning valve dividing the delivered oil into a first supply and a remainder flowing at rates in a predetermined ratio; a second proportioning valve dividing said remainder flow into second and third supplies flowing at rates in a predetermined ratio; means operated by the first and third supplies for driving the rotor and the grates; means for by-passing oil from said second supply to produce a remainder flowing at a reduced rate; means operated by said second supply remainder to drive the fuel-feeding device; a diaphragm adapted to respond to the differential of gas pressures at a pair of spaced points along the path of boiler gas flow; means including a discharge port providing a transformed oil pressure space; an orifice adapted to supply oil from a pressure source to said space; a cup valve covering said discharge port and connected to the diaphragm so that the differential gas pressure applied to the diaphragm applies force to the cup valve in the closing direction and which force is balanced by the transformed oil pressure force applied to the cup valve and tending to move the latter in an opening direction, whereby, as the differential gas pressure applied to the diaphragm changes, the transformed oil pressure changes to maintain the balanced force relation with amplification of pressure of oil with respect to the differential gas pressure in the ratio of the area of the diaphragm to that of the cup valve; and means for controlling the by-passing means in response to transformed oil pressure to maintain the fuel-air ratio.

8. In a stoker-fired boiler wherein the boiler draft is controlled in response to steam demand and wherein the stoker is furnished with fuel by a distributor rotor supplied by a feeding device and is provided with movable grates, the combination of, hydraulic motors for driving the rotor, the fuel-feeding device and the grates; a pump delivering oil at a fixed flow rate; a first proportioning valve dividing the oil delivered thereto by the pump into a first supply and a remainder having a fixed ratio of flow rates; a second proportioning valve subdividing said remainder flow into second and third supplies having a fixed ratio of flow rates; conduits delivering said first, second and third supplies for operation of the rotor, the fuel feed and grate motors, respectively; an orifice in the second supply conduit; a by-pass valve for the second supply conduit at the upstream side of the orifice; a diaphragm adapted to respond to the differential of gas pressures at a pair of spaced points along the path of boiler gas flow; means including a discharge port providing a transformed oil pressure space; an orifice adapted to supply oil from a pressure source to said space; a cup valve covering said discharge port and connected to the diaphragm so that the differential gas pressure applied to the diaphragm applies force to the cup valve in the closing direction and which force is balanced by the transformed oil pressure force applied to the cup valve and tending to move the latter in an opening direction, whereby, as the differential gas pressure applied to the diaphragm changes, the transformed oil pressure changes to maintain the balanced force relation with amplification of pressure of oil with respect to the differential gas pressure in the ratio of the area of the diaphragm to that of the cup valve; and means for controlling the by-pass valve in response to transformed oil pressure.

9. Apparatus as claimed in claim 8 with means providing for variation in flow area of the orifice.

10. In a stoker-fired boiler wherein the boiler draft is controlled in response to steam demand and wherein the stoker is furnished with fuel by a distributor rotor supplied from a fuel-feeding device and is provided with movable grates, the combination of, means delivering oil at a fixed flow rate; a first proportioning valve dividing the delivered oil into a first supply and a remainder flowing at rates in a predetermined ratio; a second proportioning valve dividing said remainder flow into second and third supplies flowing at rates in a predetermined ratio; hydraulic motors adapted to drive the rotor, the fuel-feeding device and the grates; conduits furnished with said first and third supplies for driving the rotor and grate motors; a conduit furnished with said second supply for driving the fuel-feeding device motor; an orifice in the last-named conduit; and a by-pass valve for the last-named conduit and located at the upstream side of the orifice; said by-pass valve including a valve member and opposed first and second pressure areas with the first pressure area subject to orifice upstream pressure to exert force thereon in its opening direction and the second pressure area subject to orifice downstream pressure to exert force thereon in its closing direction, means connected to the by-pass valve member and providing a third pressure area disposed so that pressure applied thereto exerts force on the valve member in its closing direction; a diaphragm adapted to respond to the differential of gas pressures at a pair of spaced points along the path of boiler gas flow; means including a discharge port providing a transformed oil pressure space; an orifice adapted to supply oil from a pressure source to said space; a cup valve covering said discharge port and connected to the diaphragm so that the differential gas pressure applied to the diaphragm applies force to the cup valve in the closing direction and which force is balanced by the transformed oil pressure force applied to the cup valve and tending to move the latter in an opening direction, whereby, as the differential gas pressure applied to the diaphragm changes, the transformed oil pressure changes to maintain the balanced force relation with amplification of pressure of oil with respect to the differential gas pressure in the ratio of the area of the diaphragm to that of the cup valve; and means for applying the transformed oil pressure to said third pressure area.

11. In a stoker-fired boiler wherein the boiler draft is controlled in response to steam demand and wherein the stoker is furnished with fuel by a distributor rotor supplied from a fuel-feeding device and is provided with movable grates, the combination of, hydraulic motors adapted to drive the rotor, the fuel-feeding device and the grates; first, second and third conduits adapted to deliver oil to the rotor, fuel-feeding device and grate motors, respectively; means providing, for the first, second and third conduits, first, second and third supplies of oil; the last-named means comprising a pump delivering oil at a constant flow rate, a first proportioning valve dividing oil delivered thereto by the pump into said first supply and a remainder having a fixed ratio of flow rates, and a second proportioning valve subdividing said remainder into said second and third supplies having a fixed ratio of flow rates; a diaphragm adapted to respond to the differential of gas pressures at a pair of spaced points along the path of boiler gas flow; means including a discharge port providing a transformed oil pressure space; an orifice adapted to supply oil from a pressure source to said space; a cup valve covering said discharge port and connected to the diaphragm so that the differential gas pressure applied to the diaphragm applies force to the cup valve in the closing direction and which force is balanced by the transformed oil pressure force applied to the cup valve and tending to move the latter in an opening direction, whereby, as the differential gas pressure applied to the diaphragm changes, the transformed oil pressure changes to maintain the balanced force relation with amplification of pressure of oil with respect to the differential gas pressure in the ratio of the area of the diaphragm to that of the cup valve; an orifice in the second conduit; a by-pass valve for the second conduit at the upstream side of the orifice; means for subjecting the by-pass valve to force in its opening direction and dependent upon differential pressure across the orifice; and means for applying force to the by-pass valve in its closing direction and dependent upon transformed oil pressure.

12. In a stoker-fired boiler wherein the boiler draft is controlled in response to steam demand and wherein the stoker is furnished with fuel by a distributor rotor supplied from a fuel-feeding device and is provided with movable grates, the combination of, hydraulic motors adapted to drive the rotor, the fuel-feeding device, and the grates; first, second and third conduits adapted to deliver oil to the respective rotor, fuel-feeding device and grate motors; means providing, for the first, second and third conduits, first, second and third supplies of oil flowing at fixed rates; the last-named means comprising a hydraulic pump having a fixed delivering flow rate, a first proportional valve dividing the oil delivered thereto by the pump into said first supply and a remainder having fixed flow rates, and a second proportioning valve subdividing said remainder flow delivered thereto into said second and third supplies of oil; a diaphragm adapted to respond to the differential of gas pressures at a pair of spaced points along the path of boiler gas flow; means including a discharge port providing a transformed oil pressure space; an orifice adapted to supply oil from a pressure source to said space; a cup valve covering said discharge port and connected to the diaphragm so that the differential gas pressure applied to the diaphragm applies force to the cup valve in the closing direction and which force is balanced by the transformed oil pressure force applied to the cup valve and tending to move the latter in an opening direction, whereby, as the differential gas pressure applied to the diaphragm changes, the transformed oil pressure changes to maintain the balanced force relation with amplification of pressure of oil with respect to the differential gas pressure in the ratio of the area of the diaphragm to that of the cup valve; an orifice in the second conduit; a by-pass port for the second conduit and arranged at the upstream side of the orifice; a by-pass valve cooperating with the discharge end of the by-pass port and subject to orifice upstream pressure exerting force thereon in its opening direction; means provided with a pressure area subject to orifice downstream pressure for exerting force on the by-pass valve in its closing direction; means provided with a pressure area subject to transformed oil pressure for exerting force on the by-pass valve in its closing direction; and manually-operable means for varying area of said orifice.

13. In a stoker-fired boiler wherein the boiler draft is controlled in response to steam demand and wherein the stoker is furnished with fuel by a distributor rotor supplied from a fuel-feeding device and is provided with movable grates, the combination of, motors adapted to drive the rotor, the fuel-feeding device, and the grates and including hydraulic motors adapted to drive the rotor and the fuel-feeding device; means delivering oil at a fixed flow rate; a first proportioning valve dividing the delivered oil into a first supply and a remainder having a fixed ratio of flow rates; a second proportioning valve subdividing said remainder flow of the second and third supplies having a fixed ratio of flow rates; conduits furnishing said first, second and third supplies for operation of the rotor, fuel-feed and grate motors, respectively; and a manual control valve for controlling the delivery of said first supply oil by its conduit to the fuel-feed motor and comprising a body having a passage included in the passageway of the conduit, a manually-adjustable valve member cooperating with said passage to provide an orifice, said passage having a by-pass opening at the upstream side of the orifice and the body having a cylinder alined with the opening, a cup valve covering the opening and subject to orifice upstream pressure tending to open it, a piston in the cylinder and having thrust engagement with the cup valve, a spring exerting force on the piston in a cup-valve-closing direction and a passage for applying orifice downstream pressure to the piston to exert force on the latter in a cup-valve-closing direction, said cup valve and piston having such ratio of pressure areas that, for any setting of the valve member, the flow through the orifice drives the motor at a speed proportional to the valve member setting.

14. In a stoker-fired boiler wherein the boiler draft is controlled in response to steam demand and wherein the stoker is furnished with fuel by a distributor rotor supplied from a fuel-feeding device and is provided with movable grates, the combination of, motors adapted to drive the rotor, the fuel-feeding device, and the grates and including hydraulic motors adapted to drive the rotor and the fuel-feeding device; a pump delivering oil at a constant flow rate; means dividing the oil discharged by the pump into first, second and third supplies having fixed ratios of flow rates; a first conduit furnishing said first supply for operation of the rotor motor; a second conduit furnishing said second supply for operation of the fuel-feed motor; a third conduit furnishing said third supply for operation of the grate motor; an orifice in said second conduit, a bypass valve comprising a body and a movable valve assembly; said body having a pair of pressure chambers, a main passage forming a part of the passageway of said second conduit, a by-pass passage, and a by-pass port connecting the main and by-pass passages; said valve assembly including a cup valve in covering relation with respect to the by-pass port and presenting an area subject to orifice upstream pressure tending to open it, first movable means defining a part of the enclosure of said first chamber and connected to the cup valve so that pressure in the chamber tends to move the cup valve in a closing direction, and second movable means forming a part of the enclosure of the second chamber so that pressure therein tends to move the cup valve in a closing direction; a diaphragm adapted to respond to the differential of gas pressures at a pair of spaced points along the path of boiler gas flow; means including a discharge port providing a transformed oil pressure space; an orifice adapted to supply oil from a pressure source to said space; a cup valve covering said discharge port and connected to the diaphragm so that the differential gas pressure applied to the diaphragm applies force to the cup valve in the closing direction and which force is balanced by the transformed oil pressure force applied to the cup valve and tending to move the latter in an opening direction, whereby, as the differential gas pressure applied to the diaphragm changes, the transformed oil pressure changes to maintain the balanced force relation with amplification of pressure of oil with respect to the differential gas pressure in the ratio of the area of the diaphragm to that of the cup valve; means for supplying fluid under transformed pressure to said first chamber; and means for supplying pressure at the downstream side of said first orifice to the second chamber.

15. In a stoker-fired boiler wherein the boiler draft is controlled in response to steam demand and wherein the stoker is furnished with fuel by a distributor rotor supplied from a fuel-feeding device and is provided with movable grates, the combination of, hydraulic motors adapted to drive the rotor, the fuel-feeding device, and the grates; means delivering oil at a fixed flow rate; means dividing the delivered oil into first, second and third supplies having fixed ratios of flow rates; a conduit furnishing said first supply for operation of the rotor motor; a second conduit including parallel branches furnishing said second supply of oil for operation of the fuel-feed motor; a transfer valve for causing the second supply oil to flow through either branch; automatic means for controlling the flow through one branch; and a manual control valve for controlling the flow through the other branch; said automatic control means including a first orifice in the first branch; a by-pass valve comprising a body and a movable valve assembly; said body having a pair of pressure chambers, a main passage connected in the passageway of said first branch, a by-pass passage, and a by-pass port connecting the main and by-pass passages; said movable valve assembly including a cup valve in covering relation with respect to the by-pass port, first movable means presenting an area forming a part of the enclosure of the first chamber and connected to the cup valve so that pressure in the chamber and applied to the area exerts force on the cup valve in a closing direction, second movable means presenting an area forming a part of the enclosure of the second chamber so that pressure therein and applied to the last-named area exerts force on the cup valve in a closing direction; a diaphragm adapted to respond to the differential of gas pressures at a pair of spaced points along the path of boiler gas flow; means including a discharge port providing a transformed oil pressure space; a second orifice adapted to supply oil from a pressure source to said space; a cup valve covering said discharge port and connected to the diaphragm so that the differential gas pressure applied to the diaphragm applies force to the cup valve in the closing direction and which force is balanced by the transformed oil pressure force applied to the cup valve and tending to move the latter in an opening direction, whereby, as the differential gas pressure applied to the diaphragm changes, the transformed oil pressure changes to maintain the balanced force relation with amplification of pressure of oil with respect to the differential gas pressure in the ratio of the area of the diaphragm to that of the cup valve; means for supplying oil under transformed pressure to said first chamber; and means for supplying pressure at the downstream side of said first orifice to the second chamber; said manual control valve for said second branch comprising a body having a passage included in the passageway of said second conduit, a manually-adjustable valve member cooperating with said passage to provide a third orifice, said passage having a by-pass opening at the upstream side of the third orifice and the body having a cylinder alined with the opening, a cup valve covering the opening and subject to third orifice upstream pressure tending to open it, a piston in the cylinder and having thrust engagement with the cup valve, a spring exerting force on the piston in a cup-valve closing direction, and a passage for applying third orifice downstream pressure to the piston to exert force on the latter in a cup-valve closing direction.

16. In a stoker-fired boiler wherein the boiler draft is controlled in response to steam demand and wherein the stoker is furnished with fuel by a distributor rotor supplied from a fuel-feeding device and is provided with movable grates, the combination of, hydraulic motors adapted to drive the rotor, the fuel-feeding device and the grates; first, second and third conduits adapted to deliver oil to the rotor, fuel-feeding device and grate motors, respectively; means providing, for the first, second and third conduits, first, second and third supplies of oil; the last-named means comprising a pump delivering oil at a constant flow rate, a first proportioning valve dividing oil delivered thereto by the pump into said first supply and a remainder having a fixed ratio of flow rates, and a second proportioning valve subdividing said remainder into said second and third supplies having a fixed ratio of flow rates; orifices in the first and second conduits; by-pass valves for the first and second conduits and located at the upstream sides of the orifices of the latter; means for subjecting each by-pass valve to opening force due to differential pressure across the associated orifice; and means for applying loading force to each valve in its closing direction.

17. In a stoker-fired boiler wherein the boiler draft is controlled in response to steam demand and wherein the stoker is furnished with fuel by a distributor rotor supplied from a fuel-feeding device and is provided with movable grates, the combination of, hydraulic motors adapted to drive the rotor, the fuel-feeding device and the grates respectively; first, second and third conduits for delivering oil to the rotor, fuel-feeding device and grate motors, respectively; means providing, for the first, second and third conduits, first, second and third supplies of oil; the last-named means comprising a pump delivering oil at a constant flow rate, a first proportioning valve dividing oil delivered thereto by the pump into said first supply and a remainder having a fixed ratio of flow rates, and a second proportioning valve subdividing said remainder into said second and third supplies having a fixed ratio of flow rates; a diaphragm adapted to respond to the differential of gas pressures at a pair of spaced points along the path of boiler gas flow; means including a discharge port providing a transformed oil pressure space; an orifice adapted to supply oil from a pressure source to said space; a cup valve covering said discharge port and connected to the diaphragm so that the differential gas pressure applied to the diaphragm applies force to the cup valve in the closing direction and which force is balanced by the transformed oil pressure force applied to the cup valve and tending to move the latter in an opening direction, whereby, as the differential gas pressure applied to the diaphragm changes, the transformed oil pressure changes to maintain the balanced force relation with amplification of pressure of oil with respect to the differential gas pressure in the ratio of the area of the diaphragm to that of the cup valve; orifices in said first and second conduits, by-pass valves for the first and second conduits and located at the upstream sides of the orifices thereof; means for subjecting each by-pass valve to opening force due to differential pressure across the associated orifice; means for applying loading force to the first conduit by-pass valve in its closing direction; and means providing a pressure area subject to transformed oil pressure for applying loading force to the second conduit by-pass valve in its closing direction.

18. In a stoker-fired boiler wherein the boiler draft is controlled in response to steam demand and wherein the stoker is furnished with fuel by a distributor rotor supplied from a fuel-feeding device and is provided with movable grates, the combination of, hydraulic motors adapted to drive the rotor, the fuel-feeding device and the grates respectively; first, second and third conduits for supplying oil for operation of the motors of the rotor, the fuel-feeding device, and the grates, respectively; said second conduit including main portions joined by first and second parallel branches; a transfer valve for causing second conduit flow to occur through either branch; means providing, for the first, second and third conduits, first, second and third supplies of oil; the last-named means comprising a pump delivering oil at a constant flow rate, a first proportioning valve dividing oil delivered thereto by the pump into said first supply and a remainder having a fixed ratio of flow rates, and a second proportioning valve subdividing said remainder into said second and third supplies; a diaphragm adapted to respond to the differential of gas pressures at a pair of spaced points along the path of boiler gas flow; means including a discharge port providing a transformed oil pressure space; an orifice adapted to supply oil from a pressure source to said space; a cup valve covering said discharge port and connected to the diaphragm so that the differential gas pressure applied to the diaphragm applies force to the cup valve in the closing direction and which force is balanced by the transformed oil pressure force applied to the cup valve and tending to move the latter in an opening direction, whereby, as the differential gas pressure applied to the diaphragm changes, the transformed oil pressure changes to maintain the balanced force relation with amplification of pressure of oil with respect to the differential gas pressure in the ratio of the area of the diaphragm to that of the cup valve; orifices in the first and second branches of the second conduit and in the first conduit; by-pass valves for the first and second branches and the first conduit and arranged at the upstream sides of the orifices thereof; means for applying loading forces to the by-pass valves of the second branch and of the first conduit in the closing directions thereof; and means providing an area subject to transformed oil pressure to apply force in a closing direction to the by-pass valve of the first branch; and manually-operable means for moving the transfer valve and for varying the flow areas of the orifices.

DONALD J. MOSSHART.

REFERENCES CITED

The following references are of record in the file of this patent:

UNITED STATES PATENTS

| Number | Name | Date |
| --- | --- | --- |
| 1,663,513 | Howse | Mar. 20, 1928 |
| 1,983,416 | Terry | Dec. 4, 1934 |
| 1,999,834 | Ernst | Apr. 30, 1935 |
| 2,220,837 | Donaldson | Nov. 5, 1940 |
| 2,365,095 | Miller et al. | Dec. 12, 1944 |